United States Patent
Hotta et al.

(10) Patent No.: US 9,278,662 B2
(45) Date of Patent: Mar. 8, 2016

(54) AIRBAG APPARATUS AND METHOD FOR ASSEMBLING THE SAME

(71) Applicant: TOYODA GOSEI CO., LTD., Kiyosu-shi, Aichi-ken (JP)

(72) Inventors: Masashi Hotta, Kiyosu (JP); Yuji Sato, Kiyosu (JP); Kensaku Honda, Kiyosu (JP); Yoshiaki Goto, Kiyosu (JP); Akira Yamashita, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 13/972,993

(22) Filed: Aug. 22, 2013

(65) Prior Publication Data

US 2014/0084570 A1 Mar. 27, 2014

(30) Foreign Application Priority Data

Sep. 27, 2012 (JP) .................................. 2012-214433

(51) Int. Cl.
*B60R 21/217* (2011.01)

(52) U.S. Cl.
CPC ........... *B60R 21/217* (2013.01); *B60R 21/2171* (2013.01); *Y10T 29/49826* (2015.01)

(58) Field of Classification Search
CPC .............. B60R 21/217; B60R 21/2171; Y10T 29/49826
USPC ........................................... 280/728.2, 730.2
See application file for complete search history.

(56) References Cited

U.S. PATENT DOCUMENTS

| 5,340,147 | A | * | 8/1994 | Fontecchio et al. | ........ 280/728.2 |
| 5,542,701 | A | * | 8/1996 | Rion | .............................. 280/735 |
| 5,704,637 | A | * | 1/1998 | Matsuura et al. | ........... 280/730.1 |
| 6,227,560 | B1 | * | 5/2001 | Volkmann et al. | ......... 280/728.2 |
| 6,231,069 | B1 | * | 5/2001 | Yokoyama | ................. 280/730.2 |
| 7,753,407 | B2 | * | 7/2010 | Yokota | ........................ 280/743.2 |
| 8,226,113 | B2 | * | 7/2012 | Yamashita | ................. 280/730.2 |
| 2002/0084630 | A1 | * | 7/2002 | Aulbach | ..................... 280/728.2 |
| 2006/0108777 | A1 | | 5/2006 | Mabuchi et al. | |
| 2008/0073883 | A1 | * | 3/2008 | Fischer et al. | ............. 280/728.2 |
| 2009/0039626 | A1 | * | 2/2009 | Yokota | ........................ 280/730.2 |
| 2011/0074136 | A1 | | 3/2011 | Honda et al. | |

(Continued)

FOREIGN PATENT DOCUMENTS

| CN | 102029966 A | 4/2011 |
| CN | 102161332 A | 8/2011 |

(Continued)

OTHER PUBLICATIONS

Office Action mailed Jun. 18, 2015 in the corresponding CN application No. 201310389759.9 (English translation attached).

(Continued)

*Primary Examiner* — Barry Gooden, Jr.
(74) *Attorney, Agent, or Firm* — Posz Law Group, PLC

(57) ABSTRACT

An airbag apparatus includes an airbag, a retainer secured to the airbag, and an elongated inflator attached to the retainer. The inflator discharges gas for inflating the airbag. The retainer includes an attaching protrusion, which protrudes in a direction intersecting an axis of the inflator and secures the retainer to a vehicle together with the airbag. The inflator includes an attaching protrusion, which protrudes in the direction intersecting the axis and secures the inflator to the vehicle together with the retainer.

5 Claims, 7 Drawing Sheets

(56) References Cited

U.S. PATENT DOCUMENTS

2011/0163521 A1* 7/2011 Gammill et al. ............ 280/728.2
2012/0274053 A1* 11/2012 Fischer ...................... 280/728.2
2013/0341892 A1* 12/2013 Honda et al. ............... 280/728.2

FOREIGN PATENT DOCUMENTS

| DE | 102010052782 A1 | 5/2012 |
|---|---|---|
| JP | 11-157409 A | 6/1999 |
| JP | 2006-88851 A | 4/2006 |
| JP | 2009-119975 A | 6/2009 |
| JP | 2011-121469 A | 6/2011 |
| JP | 2011-168106 A | 9/2011 |
| WO | 2010-131326 A1 | 11/2010 |
| WO | 2011-079178 A1 | 6/2011 |
| WO | 2012-025317 A1 | 3/2012 |

OTHER PUBLICATIONS

Japanese Office Action issued on Nov. 4, 2015 in the corresponding JP application No. 2012-214433.

* cited by examiner

AIRBAG APPARATUS AND METHOD FOR ASSEMBLING THE SAME

BACKGROUND OF THE INVENTION

The present invention relates to an airbag apparatus that protects an occupant from an impact by deploying and inflating an airbag at a position close to the occupant seated in a vehicle seat when an impact due to, for example, a collision is applied to a vehicle. The present invention also relates to a method for assembling the airbag apparatus.

An airbag apparatus is effective for protecting an occupant seated in a vehicle seat from an impact when an impact due to, for example, a collision is applied to a vehicle. As one form of the airbag apparatus, for example, Japanese Laid-Open Patent Publication No. 11-157409 discloses an airbag apparatus including a bag-shaped airbag, a retainer secured to the airbag, and an elongated inflator, which is attached to the retainer and generates gas for inflating the airbag.

The retainer has a bolt, which projects from the outer circumferential surface of the retainer in a direction perpendicular to the axis of the inflator. The inflator also has a bolt, which projects from the end surface of the inflator in the direction of the axis.

The inflator is inserted in the retainer, and the bolt of the inflator is inserted through a lid of the retainer. When a nut is fastened to the bolt, the inflator is secured to the retainer.

The bolt of the retainer is inserted through a base fabric sheet that forms the airbag, and then is inserted into a vehicle component, for example, a seat frame that forms the frame of the vehicle seat. When a nut is fastened to the bolt, the retainer is secured to the seat frame together with the airbag.

In the airbag apparatus disclosed in Japanese Laid-Open Patent Publication No. 11-157409, the bolt of the inflator is used to secure the inflator to the retainer. The inflator and retainer are secured to the seat frame with only the bolt of the retainer. Therefore, the securing strength of the inflator to the seat frame might be insufficient.

Also, while the bolt of the retainer protrudes in the direction perpendicular to the axis of the inflator, the bolt of the inflator protrude in the direction along the axis. Thus, the direction in which the nuts are tightened is largely different between the bolt of the retainer and the bolt of the inflator, which makes the tightening operation complicated.

Such a problem can also occur in an airbag apparatus installed in any type of transport vehicle.

SUMMARY OF THE INVENTION

Accordingly, it is an objective of the present invention to provide an airbag apparatus that allows an inflator and a retainer to be firmly secured to a transport vehicle with a simple operation, and a method for assembling the airbag apparatus.

To achieve the foregoing objective and in accordance with a first aspect of the present invention, an airbag apparatus is provided that includes an airbag, a retainer secured to the airbag, an elongated inflator, a retainer, and an inflator. The elongated inflator is attached to the retainer and discharges gas for inflating the airbag. The retainer securing portion is provided on the retainer. The retainer securing portion protrudes in a direction intersecting an axis of the inflator and secures the retainer to a transport vehicle together with the airbag. The inflator securing portion is provided on the inflator. The inflator securing portion protrudes in a direction intersecting the axis and secures the inflator to the transport vehicle at least together with the retainer.

With the above configuration, the retainer secured to the airbag is fixed to the transport vehicle together with the airbag at the retainer securing portion. The inflator attached to the retainer is also fixed to the transport vehicle at least together with the retainer at the inflator securing portion. In this manner, the retainer and the inflator are both directly fixed to the transport vehicle. Thus, compared to a conventional structure in which an inflator is not directly fixed to a transport vehicle, but indirectly fixed to a transport vehicle via a retainer, the retainer and the inflator are both firmly fixed to the transport vehicle.

Also, the retainer securing portion and the inflator securing portion both project in a direction intersecting the axis of the inflator. The operation for fixing the retainer securing portion and the inflator securing portion to the transport vehicle is carried out substantially in the same direction. Therefore, the inflator and the retainer are easily fixed to the transport vehicle as compared to a conventional structure in which a retainer securing portion protrudes in a direction intersecting the axis of an inflator, an inflator securing portion projects in the axial direction, and the direction of the operation for fixing the retainer securing portion and the inflator securing portion are significantly different from each other.

In accordance with a second aspect of the present invention, a method for assembling the airbag apparatus, is provided. The airbag apparatus includes an airbag, a retainer secured to the airbag, and an elongated inflator that is attached to the retainer and discharges gas for inflating the airbag. The retainer includes a retainer securing portion. The retainer securing portion protrudes in a direction intersecting an axis of the inflator and secures the retainer to a transport vehicle together with the airbag. The inflator includes an inflator securing portion. The inflator securing portion protrudes in a direction intersecting the axis, and secures the inflator to the transport vehicle in a state in which the inflator securing portion is at least engaged with an engaging portion provided on the retainer. An insertion port is formed at part of the airbag separated along the axis from the retainer securing portion. The method for assembling an airbag apparatus includes: preparing a transitional assembly in which at least part of the retainer is arranged inside the airbag and the retainer is secured to the airbag by inserting the retainer securing portion into the base fabric sheet, which forms the airbag, from the inside to the outside of the airbag; inserting at least part of the inflator into the inside of the airbag of the transitional assembly through the insertion port; and attaching the inflator to the retainer by engaging at least the inflator securing portion with the engagement portion of the retainer.

With the above assembling method, when assembling the airbag apparatus, the preparation process, the insertion process, and the attachment process are performed in order.

In the preparation process, the transitional assembly of the airbag apparatus is prepared. During preparation, at least part of the retainer is arranged inside the airbag. The retainer is secured to the airbag via the retainer securing portion by inserting the retainer securing portion in the base fabric sheet, which forms the airbag, from the inside to the outside of the airbag. In this state, the retainer ensures the space for inserting and arranging the inflator and prevents the space from losing shape.

In the insertion process, at least part of the inflator is inserted in the airbag of the transitional assembly through the insertion port. In the attachment process, at least the inflator securing portion is engaged with the engagement portion of the retainer so that the inflator is attached to the retainer.

In this manner, an airbag apparatus is obtained that includes the airbag, the retainer secured to the airbag, and the inflator attached to the retainer, and the apparatus is firmly secured to a transport vehicle with a simple operation.

DETAILED DESCRIPTION OF THE PREFERRED EMBODIMENTS

An airbag apparatus and a method for assembling the airbag apparatus according to one embodiment will now be described with reference to the drawings.

The airbag apparatus is the one that is installed by being secured to a transport vehicle.

Figure 14:
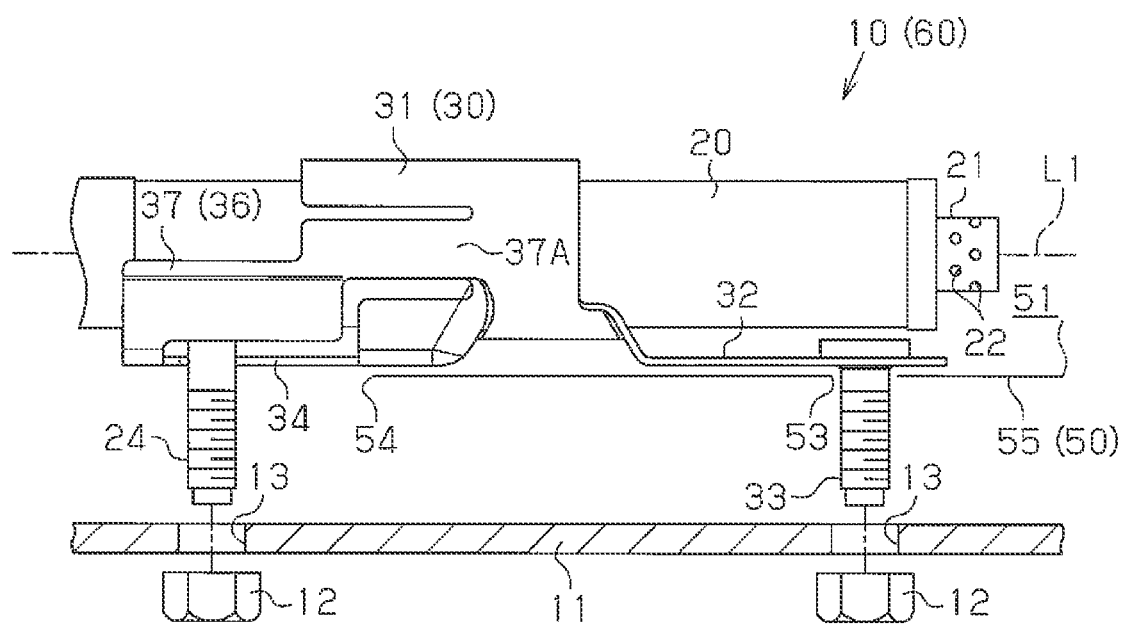
FIG. 14 is a partial cross-sectional side view illustrating the airbag apparatus before being fixed in a vehicle (vehicle component) in the embodiment of FIG. 1.

The airbag apparatus protects an occupant from an impact by deploying and inflating an airbag with inflation gas at a position close to the occupant seated in a transport vehicle seat when an impact due to, for example, a collision is applied to a vehicle. The airbag apparatus includes a gas generator 10, which generates inflation gas, in addition to the airbag 50 as shown in FIG. 14.

The gas generator 10 includes a retainer 30, which is secured to the airbag 50, and an inflator 20, which is attached to the retainer 30 and discharges gas for inflating the airbag 50. Components of the gas generator 10 will now be described.

<Inflator 20>

Figure 11:
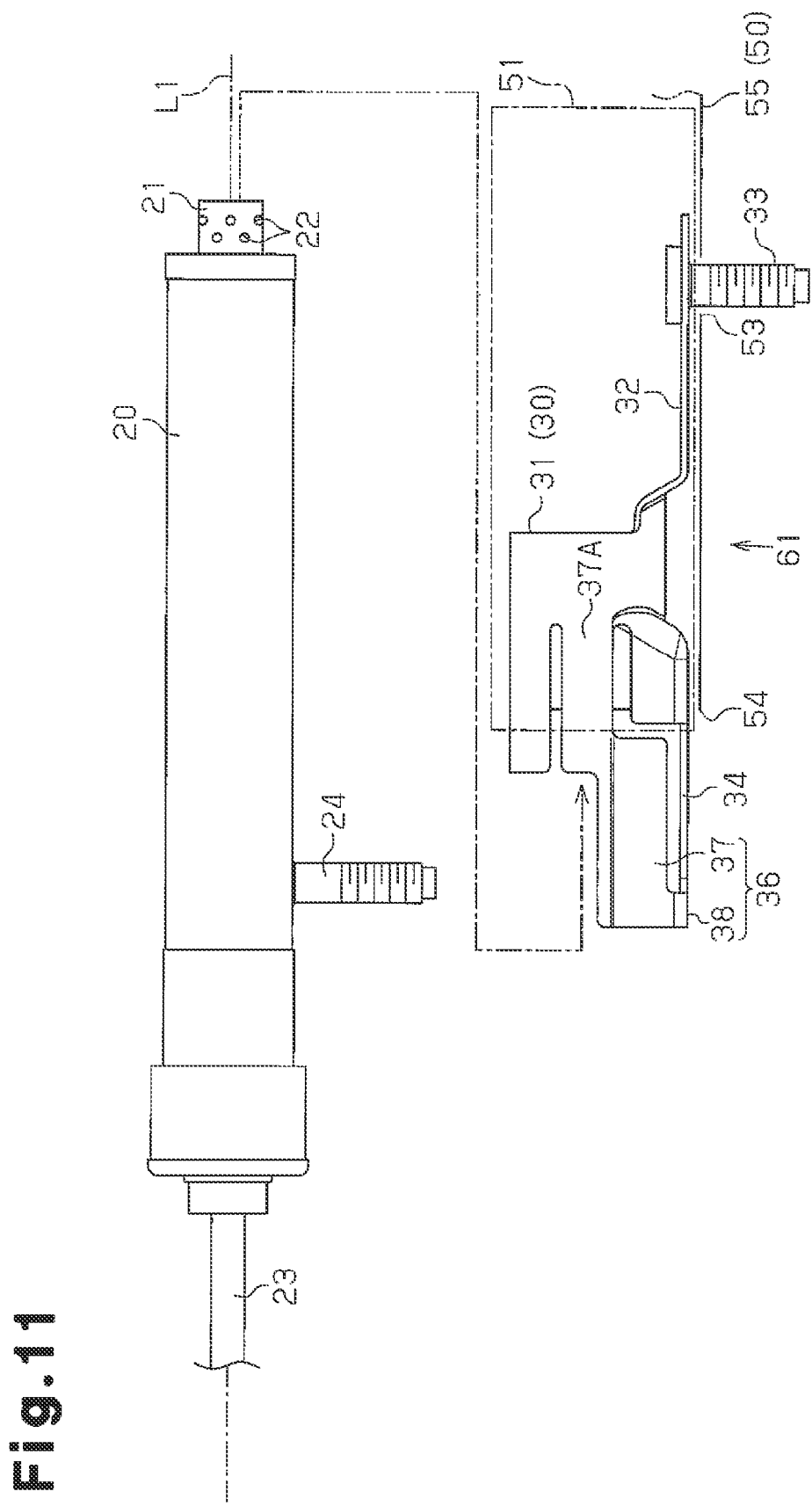
FIG. 11 is a side view illustrating the inflator and the retainer according to the embodiment of FIG. 1.

As shown in FIG. 11, the inflator 20 has an elongated columnar shape and accommodates a gas generating agent (not shown), which generates inflation gas. A small-diameter gas outlet 21, which extends along an axis L1, is formed at one end (right end in FIG. 11) of the inflator 20. A plurality of gas ports 22 are formed on the outer circumferential surface of the gas outlet 21. Also, a harness 23, which forms input wiring for an activation signal to the inflator 20, is connected to the other end (left end in FIG. 11) of the inflator 20.

The inflator 20, which uses a gas generating agent, is of the pyrotechnic type. In place of the pyrotechnic type inflator, it is possible to use a hybrid type inflator, which discharges inflation gas by breaking, with a low explosive, a partition wall of a high-pressure gas cylinder filled with high-pressure gas.

The inflator 20 has an attaching protrusion 24 as an inflator securing portion. Together with the inflator 20 and the retainer 30, the attaching protrusion 24 is fixed to a vehicle component 11 (for example, the frame of a vehicle seat shown in FIG. 14) through fastening. The attaching protrusion 24 is formed by a bolt that protrudes from the outer surface of the inflator 20 in a direction intersecting the axis L1, which is a direction perpendicular to the axis L1 in the present embodiment (a radially outward direction, or downward as viewed in FIG. 11).

In the preferred embodiment, the attaching protrusion 24 serves also as a position determining protrusion for determining the position of the inflator 20 with respect to the retainer 30. The attaching protrusion 24 has a circular cross section and an external thread like a shaft of a typical bolt.

<Retainer 30>

As shown in FIG. 14, the retainer 30 is a member to which the inflator 20 is attached. The main functions of the retainer 30 are as follows: fastening and fixing the inflator 20 to the vehicle component 11 together with the airbag 50; and ensuring space for inserting and arranging the inflator (accommodation portion 51) also, for example, during transport, and to prevent the accommodation portion 51 from losing shape in the airbag apparatus 60 that is formed into a later-discussed compact transitional assembly 61 (see FIG. 7) by folding the airbag 50.

Figure 1:
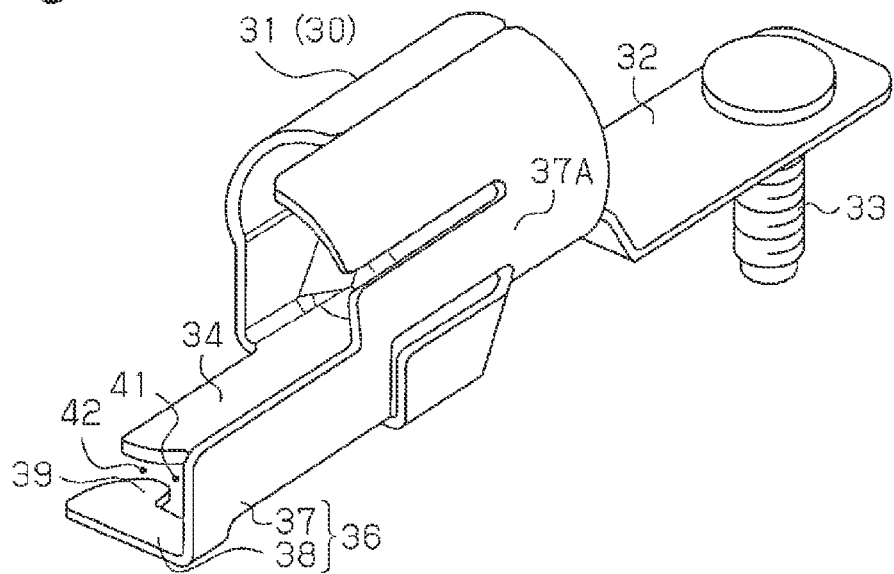
FIG. 1 is a perspective view of an airbag apparatus and a method for assembling the airbag apparatus according to one embodiment illustrating a retainer of a gas generator.
Figure 2:
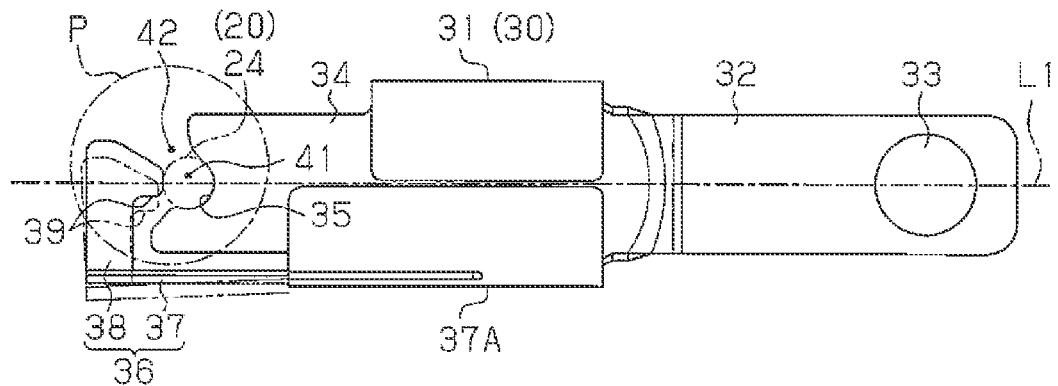
FIG. 2 is a plan view illustrating the retainer according to the embodiment of FIG. 1.
Figure 6:
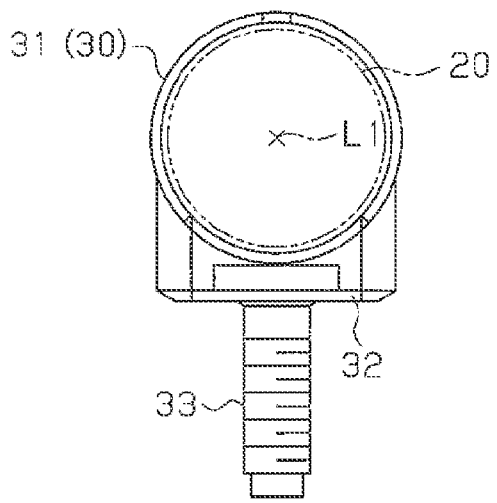
FIG. 6 is a rear view illustrating the retainer according to the embodiment of FIG. 1.

As shown in FIGS. 1, 2 and 6, the retainer 30 has a holding portion 31, which covers a part (substantially middle part) in the direction of the axis L1 of the inflator 20. In the present embodiment, the holding portion 31 is formed to have a substantially cylinder shape with open ends and extend in the direction of the axis L1. The holding portion 31 has function of guiding rotation of the inflator 20 that is inserted in the holding portion 31 and restricting wobbling of the axis L1 when the inflator 20 is rotated.

An attaching plate portion 32 extends from one end of the holding portion 31 (right end in FIGS. 1 and 2) to be parallel to the axis L1. A retainer securing portion, which is an attaching protrusion 33 in the present embodiment, is provided on the end of the attaching plate portion 32 opposite to the holding portion 31 (right end in FIGS. 1 and 2). The attaching protrusion 33 fastens and fixes the retainer 30 to the vehicle component 11 together with the airbag 50 (see FIG. 14). The attaching protrusion 33 is formed by a bolt that protrudes from the attaching plate portion 32 in a direction intersecting the axis L1. In this embodiment, the bolt protrudes in a direction perpendicular to the axis L1 (downward as viewed in FIG. 1).

Figure 4:
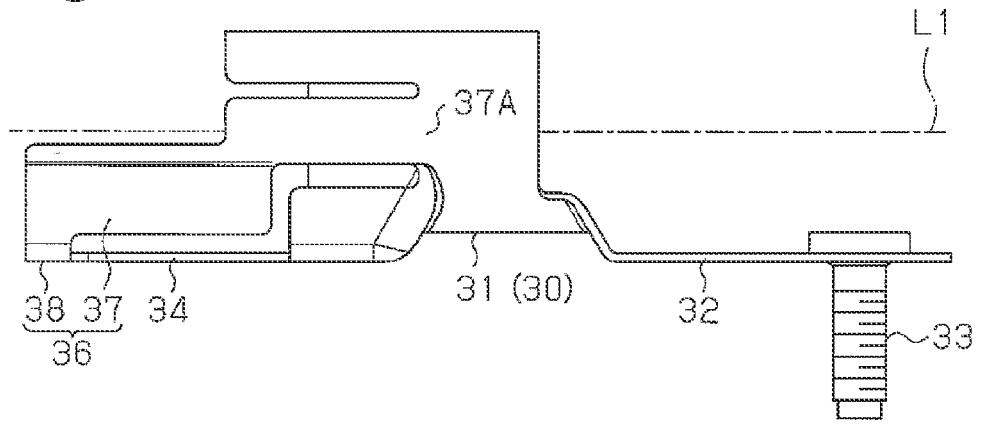
FIG. 4 is a side view illustrating the retainer according to the embodiment of FIG. 1.
Figure 5:
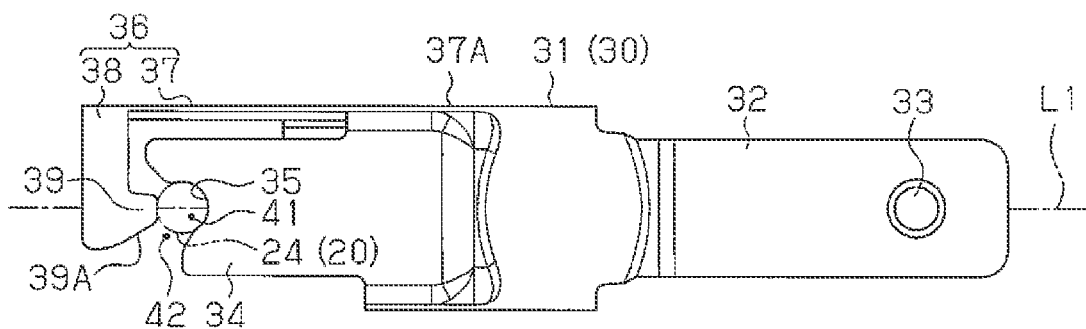
FIG. 5 is a bottom view illustrating the retainer according to the embodiment of FIG. 1.

As shown in FIGS. 4 and 5, an engagement base 34 and a tongue piece 36 extend in the direction of the axis L1 from the other end (left end as viewed in FIGS. 4 and 5) of the holding portion 31. The entire engagement base 34 is formed substantially as a flat plate and substantially parallel with the attaching plate portion 32. The tongue piece 36 includes an elastically deformable portion 37, which extends from a position that is slightly separated from the engagement base 34 in the circumferential direction of the holding portion 31. The entire elastically deformable portion 37 is formed substantially as a flat plate and substantially perpendicular to the engagement base 34. Therefore, a direction perpendicular to the surface of the elastically deformable portion 37 (thickness direction) substantially matches with the direction along the surface of the engagement base 34. Thus, when a force along the surface of the engagement base 34 is applied, the engagement base 34 is elastically deformed in that direction by a small amount, whereas the tongue piece 36 is more easily elastically deformed than the engagement base 34 about a fulcrum, which is the proximal end at which a second engagement portion 39 is not provided or a boundary 37A between the elastically deformable portion 37 and the holding portion 31.

The elastically deformable portion 37 is formed to be longer than the engagement base 34 in the direction of the axis L1. An acting portion 38 is formed by bending on the side edge of the elastically deformable portion 37 close to the engagement base 34 (lower edge in FIG. 1), and on the end opposite to the holding portion 31 (left end in FIG. 5). The acting portion 38 is formed substantially as a flat plate and is located in the same plane as the engagement base 34. The acting portion 38 is separated in the direction of the axis L1 from the engagement base 34.

The engagement base 34 includes a first engagement portion 35 on the end opposite to the holding portion 31 (left end in FIG. 5). Also, the tongue piece 36 includes the second engagement portion 39 on the end opposite to the holding portion 31 (acting portion 38). The first engagement portion 35 and the second engagement portion 39 configure an engagement portion, and is a portion with which the attaching protrusion 24 (bolt) is engaged when the inflator 20 is attached to the retainer 30. Referring to FIGS. 2 and 11, the engagement portions 35, 39 of the engagement base 34 and the tongue piece 36 are arranged in the vicinity of an insertion port 54 of the airbag 50. The vicinity of the insertion port 54 includes not only the area outside the insertion port 54 shown in FIG. 11, but also the area between the insertion port 54 and the attaching protrusion 33.

The engagement portions 35, 39 oppose each other along the axis L1, and function to sandwich the attaching protrusion 24 (bolt) from both sides. Also, the space sandwiched by the engagement portions 35, 39 configures an engagement space 41, which is flat and substantially circular. When the inflator 20, part of which is covered by the holding portion 31, is rotated about the axis L1, the attaching protrusion 24 (bolt) enters and is engaged with the engagement space 41. To allow the engagement of the attaching protrusion 24 (bolt) associated with rotation of the inflator 20, an inlet 42 of the engagement space 41 is formed between the tongue piece 36 and the engagement base 34.

Figure 3:
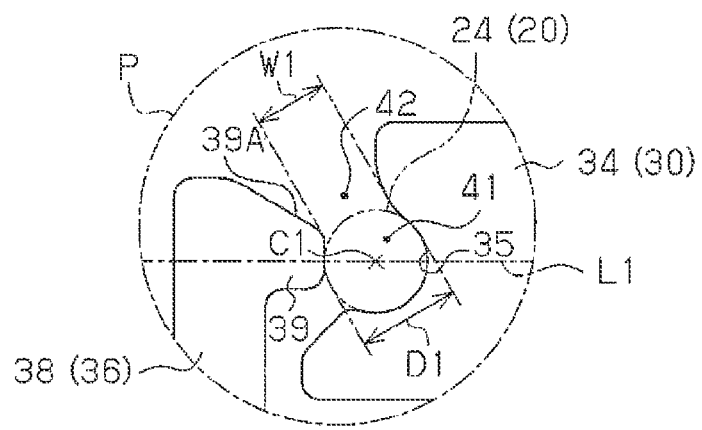
FIG. 3 is an enlarged partial plan view illustrating section P in FIG. 2.

As illustrated in FIG. 3, the first engagement portion 35 is a recess that is recessed away from the second engagement portion 39 in the direction of the axis L1, that is, recessed rightward as viewed in FIG. 3. The recess is arcuate and has substantially the same curvature as the attaching protrusion 24 (bolt). The second engagement portion 39 is formed by a projection that protrudes toward the first engagement portion 35.

In a state in which the attaching protrusion 24 is not clamped by the first engagement portion 35 and the second engagement portion 39, that is, in a state in which the elastically deformable portion 37 of the tongue piece 36 is not elastically deformed, the width W1 of the inlet 42 of the engagement space 41 is less than the size or the outer diameter D1 of the attaching protrusion 24.

Further, an edge 39A of the second engagement portion 39 that faces the inlet 42 (upper side as viewed in FIG. 3) is inclined with respect to the axis L1 and extends toward the center C1 of the first engagement portion 35.

A major part of the retainer 30, which has the above described structure, is formed by bending a plate, such as a metal plate.

Next, the airbag 50, which forms the airbag apparatus 60 (see FIG. 13) together with the gas generator 10, will be described.

<Airbag 50>

The airbag 50 is formed by sewing a base fabric sheet 55 (also referred to as a fabric panel) into a bag shape. The base fabric sheet 55 is preferably formed of a material having high strength and flexibility to be easily folded. The material may be, for example, woven cloth formed of polyester threads or polyamide threads.

Figure 7:
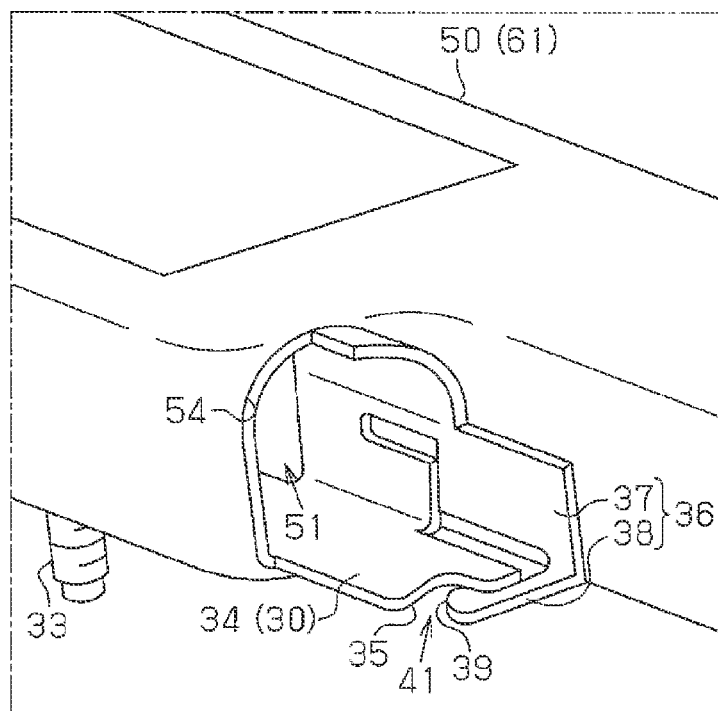
FIG. 7 is a partial perspective view illustrating part of a transitional assembly (insertion port and its periphery) according to the embodiment of FIG. 1.

As shown in FIGS. 7 and 11, the airbag 50 includes, in its inside at an end, an accommodation portion 51, which is a space for receiving a part of the gas generator 10. Most part of the airbag 50 except the accommodation portion 51 is folded.

The accommodation portion 51 receives part of the retainer 30 prior to the inflator 20. The part of the retainer 30 includes most part of the holding portion 31. The first engagement portion 35 and the second engagement portion 39 are arranged outside of the accommodation portion 51 of the airbag 50.

The base fabric sheet 55 that forms the airbag 50 has a passage hole 53. The attaching protrusion 33 of the retainer 30 is inserted in the passage hole 53 from the inside of the accommodation portion 51 to the outside.

The insertion port 54 is formed in the airbag 50. When the inflator 20 is attached to the retainer 30 from the outside of the airbag 50, the inflator 20 is inserted in the insertion portion 54. The insertion port 54 is formed in the airbag 50 separate from the attaching protrusion 33 in the direction of the axis L1 (leftward in FIG. 11). In the present embodiment, the insertion port 54 is formed between the attaching protrusion 33 and the engagement portions 35, 39 to satisfy the above condition.

The insertion port 54 has a size that allows part of the inflator 20 except the attaching protrusion 24 to pass through. Also, according to the present embodiment, the insertion port 54 has a size that allows the retainer 30, which has the attaching protrusion 33, to pass through.

During an assembly step in its production, the airbag apparatus 60 takes on a transitional form, in which only the retainer 30 of the gas generator 10 is arranged in the accommodation portion 51 inside the airbag 50. To distinguish the form of the airbag apparatus 60 at this time from the completed airbag apparatus 60, the form is referred to as a transitional assembly 61. The transitional assembly 61 is designed as a suitable form for being transported between two different manufacturing bases, or between a first manufacturing base and a second manufacturing base.

Next, operation of the present embodiment will be described with reference to FIGS. 7 to 13, together with a method for assembling the airbag apparatus 60 using the above described components. When the assembling method is executed, a preparation process, an insertion process, and attachment process are performed sequentially. The preparation process is performed at the first manufacturing base, and the insertion process and the attachment process are performed at the second manufacturing base. The contents of each process will now be described.

<Preparation Process>

As shown in FIGS. 7 and 11, the transitional assembly 61 of the airbag apparatus 60 is prepared in the preparation process. In the transitional assembly 61, part of the retainer 30 (the entire attaching plate portion 32 and a major part of the holding portion 31) is arranged in the airbag 50 (the accommodation portion 51). The first engagement portion 35 and the second engagement portion 39 are arranged at a position separate from the attaching protrusion 33 toward the insertion port 54, in the present embodiment, at a position separate from the attaching protrusion 33 further than the insertion port 54 (outside of the airbag 50). Most part of the holding portion 31 is arranged in the vicinity of the insertion port 54 in the accommodation portion 51.

Also, the attaching protrusion 33 is inserted in the passage hole 53 of the base fabric sheet 55 from the inside to the outside of the accommodation portion 51 (upper side to lower side in FIG. 11). Thus, the retainer 30 is secured the airbag 50 by the attaching protrusion 33.

This state is achieved by passing the attaching protrusion 33 (bolt) of the retainer 30 through the passage hole 53 to secure the retainer 30 to the base fabric sheet 55 in the process of the sewing of the airbag 50, and thereafter resuming the sewing process of the airbag 50.

Alternatively, after the sewing process of the airbag 50, the retainer 30 may be secured to the base fabric sheet 55 by inserting part of the retainer 30, that is, the attaching protrusion 33 (bolt), the attaching plate portion 32, and the holding portion 31 into the accommodation portion 51 through the insertion port 54, and passing the attaching protrusion 33 through the passage hole 53.

In the transitional assembly 61, a major part of the airbag 50 except the accommodation portion 51 are folded. The accommodation portion 51 and the folded part of the airbag 50 are wrapped with a wrapping means such as a wrapping sheet (not shown). However, the insertion port 54 is exposed.

In the transitional assembly 61, the retainer 30 maintains the space for receiving and accommodating the inflator 20 (the accommodation portion 51) and prevents the accommodation portion 51 from losing shape. Particularly, the holding portion 31 maintains the opening state of the insertion port 54.

<Insertion Process>

Figure 8:
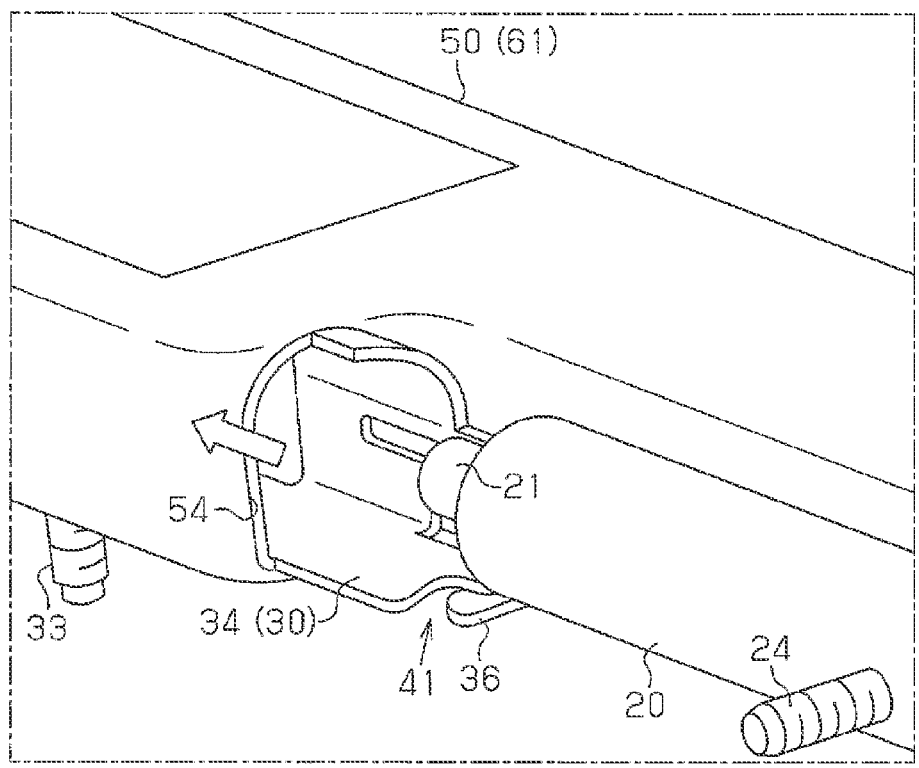
FIG. 8 is a partial perspective view illustrating a manner in which the inflator is inserted in the transitional assembly of FIG. 7 through the insertion port.

In the insertion process, outside the airbag 50, part of the inflator 20 is inserted into the interior (the accommodation portion 51) of the airbag 50 in the transitional assembly 61 from one end in the direction of the axis L1 (the gas outlet 21) through the insertion port 54, as indicated by the arrow in FIG. 8. At this time, since the insertion port 54 is maintained to the open state by the closely located holding portion 31, the inflator 20 can be easily inserted into the insertion port 54. The inflator 20 is inserted with the attaching protrusion 24 (bolt) protruding in a direction substantially perpendicular to the attaching protrusion 33 (bolt) (substantially leftward in FIG. 8).

<Attachment Process>

Figure 9:
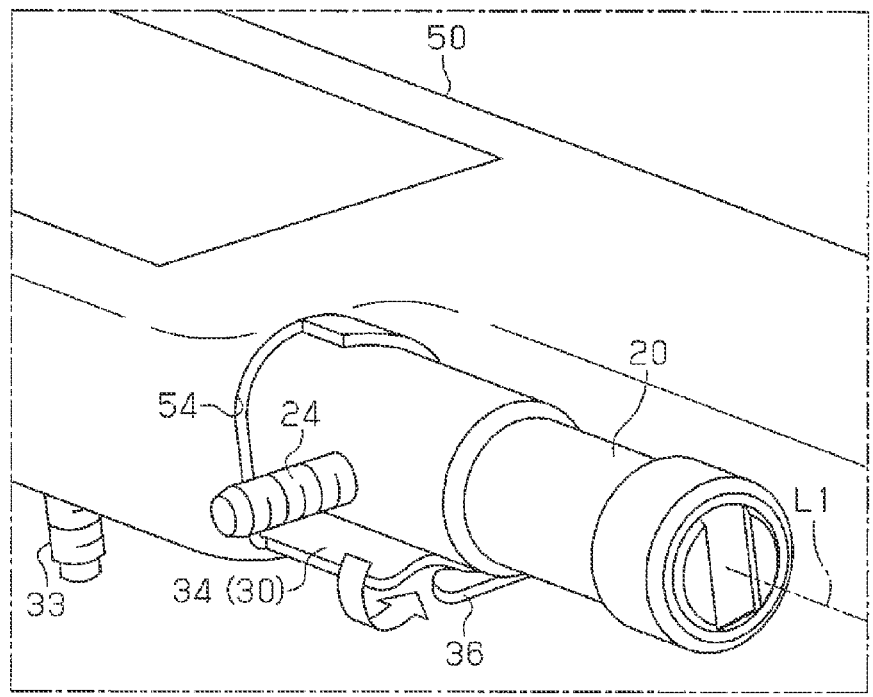
FIG. 9 is a partial perspective view illustrating a manner in which part of the inflator is inserted in the transitional assembly of FIG. 8 through the insertion port.

The attachment process is a process for attaching the inflator 20 to the retainer 30. In the attachment process, the part of the inflator 20 that has been inserted into the insertion port 54 is inserted into the holding portion 31 of the retainer 30. In the present embodiment, in which the holding portion 31 is arranged in the vicinity of the insertion port 54, part of the inflator 20 is inserted into the holding portion 31 substantially at the same time as it is inserted into the insertion port 54. As shown in FIG. 9, the inflator 20 is inserted until the attaching protrusion 24 of the inflator 20 is close to the accommodation portion 51.

Figure 12A:
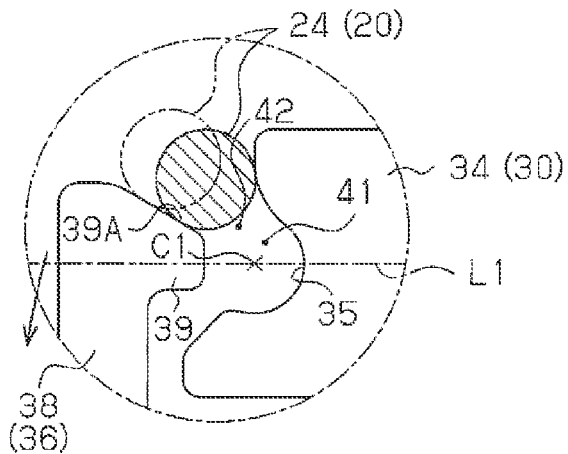
FIGS. 12A to 12C are partial plan views corresponding to FIG. 3, illustrating a process in which the attaching protrusion (bolt) of the inflator is engaged with the engagement portion of the retainer.

At this time, as shown by solid line in FIG. 12A, even when the attaching protrusion 24 is engaged with the tongue piece 36 and the engagement base 34, the attaching protrusion 24 (bolt) is prevented from entering the engagement space 41 through the inlet 42. This is because the inlet 42 of the engagement space 41 is narrower than the outer diameter of the attaching protrusion 24 (bolt) as shown in FIG. 3.

Next, as indicated by the arrow in FIG. 9, a force that acts to rotate the inflator 20 counterclockwise as viewed in FIG. 9 about the axis L1 is applied to the inflator 20 so that the attaching protrusion 24 (bolt) increases the width of the inlet 42. At this time, the holding portion 31 functions to guide the rotation of the inflator 20 (to prevent wobbling of the axis L1).

As shown in FIG. 12A, the force that acts to rotate the inflator 20 is transmitted to the second engagement portion 39 (protrusion) of the acting portion 38 through the attaching protrusion 24 (bolt) and the inclined edge 39A. The rotation direction of the inflator 20 is substantially the same as the thickness direction of the elastically deformable portion 37 of the tongue piece 36. Thus, the tongue piece 36 is more easily elastically deformed to increase the width W1 of the inlet 42 (substantially downward in FIG. 2) as shown by solid arrow in FIG. 12A about a fulcrum, which is the end at which the second engagement portion 39 is not provided or the boundary 37A between the elastically deformable portion 37 and the holding portion 31.

Figure 12B:
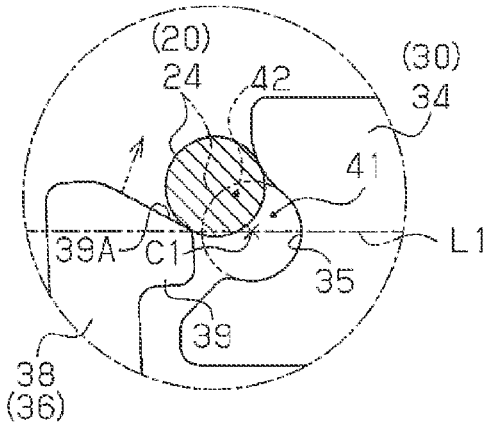
Figure 12C:
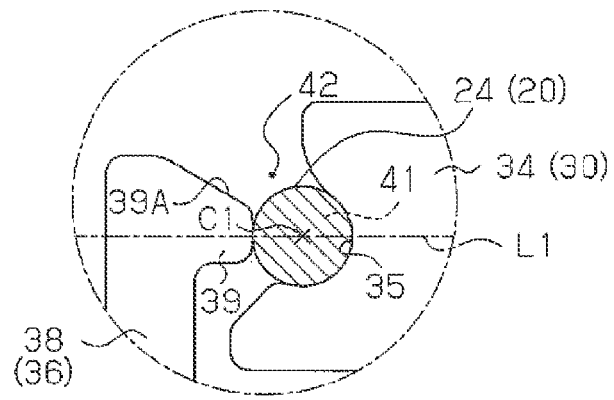

At the elastic deformation, the second engagement portion 39 (protrusion) is moved away from the first engagement portion 35 (recess) in the circumferential direction of the holding portion 31 as shown in FIG. 12B, so that the width W1 of the inlet 42 is increased. Also, since the edge 39A is inclined relative to the axis L1 and extends toward the center C1 of the first engagement portion 35 (recess), the attaching protrusion 24 (bolt) slides on the edge 39A as the inflator 20 rotates, so that the attaching protrusion 24 is guided to the first engagement portion 35 (recess). When the width W1 of the inlet 42 is increased to be greater than the size (the outer diameter D1) of the attaching protrusion 24 (bolt), the attaching protrusion 24 (bolt) can enter into the engagement space 41. As shown in FIG. 12(C), with the attaching protrusion 24 (bolt), which has a circular cross-sectional shape, in the engagement space 41, part of the attaching protrusion 24 (bolt) is engaged with the arcuate first engagement portion 35 (recess), which has substantially the same curvature as that of the protrusion 24, with no or little clearance.

At this time, since the engagement portions 35, 39 are located at a position separate from the attaching protrusion (bolt) of the retainer 30 toward the insertion port 54, the engagement of the attaching protrusion 24 (bolt) with the engagement portions 35, 39 occurs at a position separate from the attaching protrusion 33 (bolt) toward the insertion port 54. Thus, as compared to a case in which the engagement portions 35, 39 of the retainer 30 are located at a position inward of the airbag 50 further from the attaching protrusion (bolt), the attaching protrusion 24 (bolt) is easily engaged with the engagement portions 35, 39.

In particular, in the present embodiment, the above-mentioned operation is performed at a position outside the airbag 50 (accommodation portion 51) where there is a large space and that has excellent visibility. Thus, as compared to the ease in which the engagement portions 35, 39 are arranged inside the airbag 50 (accommodation portion 51), the attaching protrusion 24 (bolt) is easily engaged with the engagement portions 35, 39.

The direction of rotation of the inflator 20 is the same as the direction along the surface of the engagement base 34. Thus, if the attaching protrusion 24 pushes the engagement base 34, the amount of elastic deformation in the direction of the engagement base 34 is small.

Figure 10:
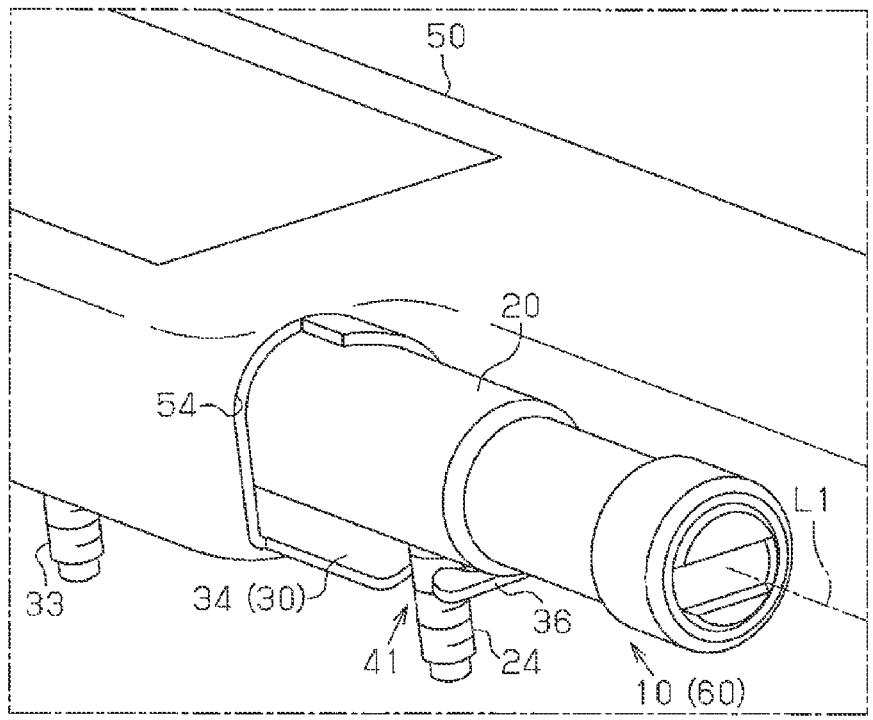
FIG. 10 is a partial perspective view illustrating a state in which the inflator of FIG. 9 is rotated about the axis, and the attaching protrusion (bolt) of the inflator is engaged with the engagement portion of the retainer.

Also, when the attaching protrusion 24 enters the engagement space 41 as described above, the tongue piece 36, which has been elastically deformed, acts to restore its original shape to reduce the width W1 of the inlet 42 in the circumferential direction of the holding portion 31 by the own elastic shape restoring force (of the elastically deformable portion 37), as indicated by the arrow of a broken line in which a long dash alternates with a pair of short dashes in FIG. 12B. Through the elastic deformation, the second engagement portion 39 (protrusion) of the tongue piece 36 pushes the attaching protrusion 24 (bolt) toward the first engagement portion 35 (recess). As shown in FIGS. 10 and 12C, the attaching protrusion 24 (bolt) becomes clamped by the first engagement portion 35 (recess) and the second engagement portion 39 (protrusion) from opposite sides in the direction of the axis L1. In this state, the direction of the elastic shape restoration is substantially the same as the thickness direction of the elastically deformable portion 37. Therefore, the amount of the elastic shape restoration of the tongue piece 36 is great so that there is no or little clearance between the engagement portions 35, 39 and the attaching protrusion 24 (bolt). The position of the attaching protrusion 24 (bolt) in the direction of the axis L1 is determined so that rattling of the inflator 20 in that direction is reduced.

Also, the position of the inflator 20 in the circumferential direction is determined by the engagement with the first engagement portion 35 (recess) of the attaching protrusion 24 (bolt), so that rattling of the inflator 20 in that direction is reduced. In this state, the attaching protrusion 24 (bolt) is substantially parallel with the attaching protrusion 33 (bolt).

In this manner, the attaching protrusion 24 is engaged with the engagement portions 35, 39 of the retainer 30, so that the inflator 20 is attached to the transitional assembly 61 with its position determined. The intended airbag apparatus 60 is thus obtained.

The inflator 20 is attached only by inserting the inflator 20 in the holding portion 31 as described above, and rotating the inflator 20 about the axis L1. The load required to rotate the inflator 20 changes before and after the attaching protrusion 24 (bolt) is engaged with the first engagement portion 35 (recess). That is, the operation load increases as the inflator 20 is rotated before engagement, and rapidly decreases after engagement. This provides a clicking sensation, which improves the operational sensation.

When removing the inflator 20 from the retainer 30, the inflator 20 is rotated in the opposite direction to the direction when the inflator 20 is assembled. The rotating direction of the inflator 20 at this time is different from the direction of the elastic deformation of the tongue piece 36 to widen the inlet 42. Therefore, the inflator 20 needs to be rotated by a greater force than when the inflator 20 is assembled to the retainer 30. This means that, once clamped by the first engagement portion 35 and the second engagement portion 39, the attaching protrusion 24 (bolt) is hard to escape and hard to be removed from the engagement space 41.

Figure 15:
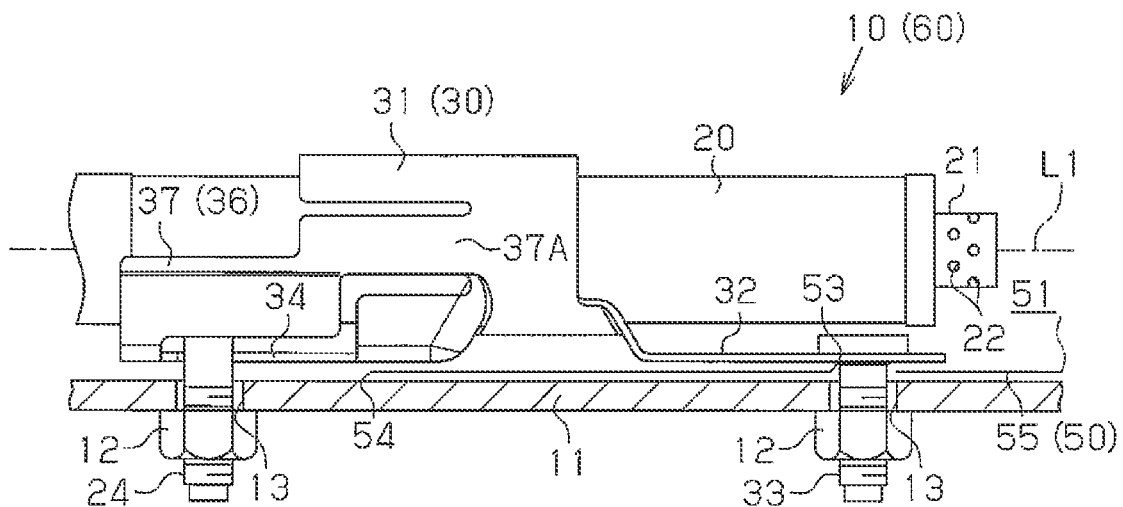
FIG. 15 is a partial cross-sectional side view illustrating the airbag apparatus after being fixed in a vehicle (vehicle component) in the embodiment of FIG. 1.

The attaching protrusion 24, 33 (bolts) of the airbag apparatus 60, which has been produced by the above described procedure, are passed through passage holes 13 formed in the vehicle component 11 (frame) as shown in FIG. 14. The passage is carried out by regulating the orientation such that the attaching protrusions 24, 33 (bolts) project toward the passage holes 13, and then moving the airbag apparatus 60 toward the vehicle component 11 (frame). Further, nuts 12 are threaded and fastened to the attaching protrusions 24, 33 (bolts), which have been passed through the vehicle component 11, from a direction intersecting (perpendicular to) the axis L1 of the inflator 20. Then, as shown in FIG. 15, the retainer 30 is fixed to the vehicle component 11 together with the airbag 50 by the attaching protrusion 33 (bolt) and the nut 12. Also, the inflator 20, which is attached to the retainer 30, is fixed to the vehicle component 11 together with the retainer 30 by the attaching protrusion 24 and the nut 12.

As described above, the retainer 30 and the inflator 20 are both directly fixed to the vehicle component 11. Thus, compared to a conventional structure in which an inflator is not directly fixed to a vehicle component, but indirectly fixed to a vehicle component via a retainer (refer to Japanese Laid-Open Patent. Publication No. 11-157409), the retainer 30 and the inflator 20 are both firmly fixed to the vehicle component 11.

Also, the attaching protrusion 33 and the attaching protrusion 24 both project in a direction intersecting (perpendicular to) the axis L1 of the inflator 20. The operation for fixing the attaching protrusions 33, 24 to the vehicle component 11 is carried out substantially in the same direction. Therefore, the inflator 20 and the retainer 30 are easily fixed to the vehicle component 11 as compared to a conventional structure in which an attaching protrusion of a retainer protrudes in a direction intersecting (perpendicular to) the axis of an inflator, an attaching protrusion of the inflator projects in the axial direction, and the direction of the operation for fixing the attaching protrusions to the vehicle component are significantly different from each other (refer to Japanese Laid-Open Patent Publication. No. 11-157409).

In the airbag apparatus 60 before being fixed to the vehicle component 11 (see FIG. 13), the attaching protrusions 24, 33 are fixed to separate members (the inflator 20, and the retainer 30), and the attaching protrusion 33 is passed through the pliable airbag 50. Therefore, for example, when the inflator 20 receives a great force in the circumferential direction via the attaching protrusion 24, the attaching protrusion 24 may possibly escape from the engagement space 41.

However, in a state in which the airbag apparatus 60 is fixed to the vehicle component 11 as described above (see FIG. 15), both attaching protrusions 24, 33 are fixed to the rigid vehicle component 11 (the frame). Thus, even if the attaching protrusion 24 receives a force, the attaching protrusion 24 is unlikely to be moved in any direction. Thus, the attaching protrusion 24 is unlikely to escape from the engagement space 41.

When a vehicle equipped with the above described airbag apparatus 60 receives an impact due to, for example, a collision while moving, the impact is detected by a sensor (not shown). In response to a detection signal of the sensor, a control unit (not shown) delivers a command signal for activating the inflator 20 to the inflator 20 via the harness 23. In response to the command signal, the gas generating agent of the inflator 20 generates gas, which is ejected outward in the radial direction via the gas ports 22 of the gas outlet 21. When receiving the gas, the airbag 50 is inflated in the vicinity of the occupant while being unfolded (deployed), thereby reducing the impact to protect the occupant.

The present embodiment described above has the following advantages.

(1) The retainer 30 includes the attaching protrusion 33 (bolt), which protrudes in the direction intersecting (perpendicular to) the axis L1 of the inflator 20 and fixes the retainer 30 to the vehicle (vehicle component 11) together with the airbag 50. Also, the inflator 20 includes the attaching protrusion 24, which protrudes in the direction intersecting (perpendicular to) the axis L1 and fixes the inflator 20 to the vehicle component 11 together with the retainer 30 (FIG. 14).

As described above, since the attaching protrusions 33, 24 are provided on the retainer 30 and the inflator 20, and further protrude in the direction intersecting (perpendicular to) the axis L1, the inflator 20 and the retainer 30 are firmly fixed to the vehicle component 11 by simple operation.

(2) The retainer 30 includes the first engagement portion 35 and the second engagement portion 39, with which the attaching protrusion 24 (bolt) is engaged when attaching the inflator 20 (FIG. 2).

Thus, by engaging the attaching protrusion 24 with the engagement portions 35, 39 of the retainer 30, the inflator 20 is attached to the retainer 30 secured to the airbag 50 with the position of the inflator 20 being determined.

Figure 13:
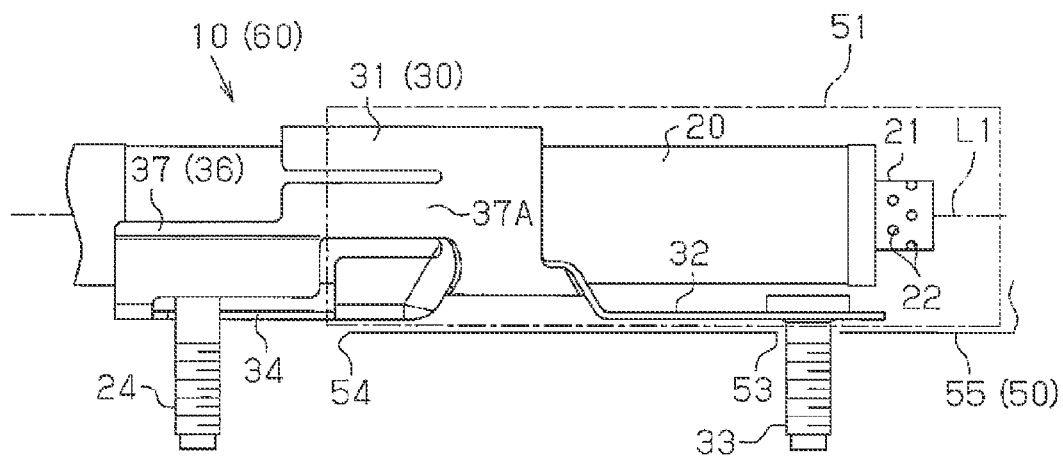
FIG. 13 is a partial cross-sectional side view illustrating a state in which part of the gas generator is arranged in an accommodation portion of the airbag.

(3) The retainer 30 includes the holding portion 31, which covers part of the inflator 20 in the direction of the axis L1. Then, the attaching protrusion 24 is engaged with the engagement portions 35, 39 by rotating the inflator 20, part of which is covered by the holding portion 31 as described, above, about the axis L1 (FIGS. 9, 10, and 13).

Thus, the inflator 20 is attached to the retainer 30 by the insertion of the inflator 20 in the holding portion 31, and the engagement of the attaching protrusion 24 with the engagement portions 35, 39.

(4) The attaching protrusion 33 is inserted in the base fabric sheet 55, which forms the airbag 50, from the inside to the outside of the airbag 50. The insertion port 54 for the inflator 20 is formed in the airbag 50 at a position separate from the attaching protrusion 33 in the direction of the axis L1 (FIG. 11). The engagement portions 35, 39 of the retainer 30 are arranged in the vicinity of the insertion port 54 (FIG. 7).

Thus, as compared to a case in which the engagement portions 35, 39 of the retainer 30 are located at a position separate from the insertion port 54 further inward of the airbag 50 than the attaching protrusion 33, the attaching protrusion 24 (bolt) is easily engaged with the engagement portions 35, 39.

(5) In the transitional assembly 61, the holding portion 31 of the retainer 30 is arranged in the vicinity of the insertion port 54 (FIG. 11).

Therefore, the holding portion 31 keeps the insertion port 54 open, and allows the inflator 20 outside of the airbag 50 to be easily inserted in the insertion port 54.

(6) The retainer 30 is secured to the airbag 50 (FIG. 7) with the engagement portions 35, 39 located outside of the airbag 50.

Thus, the attaching protrusion 24 is engaged with the engagement portions 35, 39 at a position where there is a large space and that has excellent visibility as compared to the case in which the engagement portions 35, 39 are located in the airbag 50 (accommodation portion 51). This improves the workability.

(7) When assembling the airbag apparatus 60, the preparation process, the insertion process, and the attachment process are performed in order. In the preparation process, the transitional assembly 61, in which only the inflator 20 is secured to the airbag 50, is prepared (FIG. 7). In the insertion process, part of the inflator 20 is inserted, through the insertion port 54, to the inside of the airbag 50 (accommodation portion 51) in the transitional assembly 61 (FIGS. 8 and 9). In the attachment process, the inflator 20 is attached to the retainer 30 by rotating the inflator 20 with part of the inflator 20 inserted in the holding portion 31, so that the attaching protrusion 24 is engaged with the engagement portions 35, 39 (FIGS. 9 and 10).

Thus, the airbag apparatus 60 is obtained that includes the airbag 50, the retainer 30 secured to the airbag 50, and the inflator 20 attached to the retainer 30, and is firmly secured to the vehicle (vehicle component 11) with simple operation.

(8) In the preparation process, part of the retainer 30 is arranged inside the airbag 50 (accommodation portion 51) such that the engagement portions 35, 39 are located at a position separate from the attaching protrusion 33 toward the insertion port 54 (FIG. 7).

Thus, as compared to a case in which the engagement portions 35, 39 of the retainer 30 are located at a position separate from the attaching protrusion 33 further inward of the airbag 50, the attaching protrusion 24 (bolt) is easily engaged with the engagement portions 35, 39.

(9) In the attachment process, part of the inflator 20 is inserted in the holding portion 31. In this state, the inflator 20 is rotated about the axis L1 so that the attaching protrusion 24 is engaged with the engagement portions 35, 39 (FIGS. 12A to 12C).

Therefore, in the attachment process, the inflator 20 is attached to the retainer 30 by simple operation, that is, by rotating the inflator 20 after inserting part of the inflator 20 in the holding portion 31.

(10) In the preparation process, the transitional assembly 61 is prepared, in which the holding portion 31 is arranged in the vicinity of the insertion port 54 (FIG. 7).

Therefore, the insertion port 54 is kept open, and the inflator 20 outside of the airbag 50 is allowed to be easily inserted in the insertion port 54 in the preparation process.

(11) In the preparation process, the transitional assembly 61 is prepared in which the engagement portions 35, 39 are arranged outside of the airbag 50 (FIG. 7).

Therefore, as compared to the case in which the engagement portions 35, 39 are arranged in the airbag 50, the attaching protrusion 24 is easily engaged with the engagement portions 35, 39 in the attachment process.

The above embodiment may be modified as follows.

<Regarding Inflator 20>

A positioning protrusion may be provided separately from the attaching protrusion 24 (bolt) of the inflator 20. In this case, the positioning protrusion may be shorter than the attaching protrusion 24 (bolt) as long as the positioning protrusion can be clamped by the first engagement portion 35 and the second engagement portion 39.

<Regarding Inflator Securing Portion and Retainer Securing Portion>

As the inflator securing portion, a member different from the attaching protrusion 24 (bolt) may be employed as long as the inflator 20 can be secured to the transport vehicle (vehicle component) at least together with the retainer 30. Similarly, as the retainer securing portion, a member different from the attaching protrusion 33 (bolt) may be employed as long as the retainer 30 can be secured to the transport vehicle (vehicle component) together with the airbag 50.

The inflator securing portion may be provided at multiple positions of the inflator 20 in the direction of the axis L1 of the inflator 20.

The inflator securing portion may be inserted in the retainer 30, the airbag 50, and the vehicle component 11, and fastened to the vehicle component 11 with the nut 12. In this case, the inflator 20 is secured to the transport vehicle (vehicle component) together with the retainer 30 and the airbag 50.

At least one of the inflator securing portion and the retainer securing portion may intersect the axis L1 of the inflator 20 at an angle other than the right angle.

The inflator securing portion and the retainer securing portion may protrude in different directions from each other as long as they intersect the axis L1 of the inflator 20.

The inflator securing portion and the retainer securing portion may be secured to different vehicle components in the transport vehicle.

The retainer securing portion may be provided at multiple positions of the retainer 30 in the direction of the axis L1 of the inflator 20.

<Regarding Holding Portion 31>

As long as the holding portion 31 covers part of the inflator 20 in the direction of the axis L1, the holding portion 31 may have a (non-tubular) shape different from that described in the above embodiment.

The holding portion 31 may be located at a position off the center of the retainer 30 in the direction of the axis L1 of the inflator 20.

The holding portion 31 may be provided at multiple positions in the direction of the axis L1 of the inflator 20.

<Regarding Engagement Ease 34>

The engagement base 34 may extend in the direction of the axis L1 of the inflator 20 from part of the retainer 30 that is not the holding portion 31.

The engagement base 34 does not necessarily have to extend in the direction of the axis L1 of the inflator 20. For example, part (an end) of the holding portion 31 may function as the engagement base 34.

<Regarding Tongue Piece 36>

The tongue piece 36 may extend in the direction of the axis L1 of the inflator 20 from part of the retainer 30 that is not the holding portion 31. In this case also, the tongue piece 36 is configured to be elastically deformed about a fulcrum, which is the end at which the second engagement portion 39 is not provided.

<Regarding Engaging Portion>

Part of the second engagement portion 39 (protrusion) that elastically contact the attaching protrusion 24 (bolt) may be an arcuate recess that matches the cross-section of the attaching protrusion 24 (bolt). In this case, the attaching protrusion 24 (bolt) is further prevented from moving in the circumferential direction of the holding portion 31.

Contrary to the illustrated embodiment, the second engagement portion 39 may be formed by a recess and the first engagement portion 35 may be formed by a protrusion.

The second engagement portion 39 (protrusion) may be located at part (middle part) of the tongue piece 36 other than the end.

The engagement portion may be configured such that the inflator securing portion is engaged by motion other than rotation of the inflator 20 about the axis L1.

<Regarding Engagement Space 41>

The inlet 42 of the engagement space 41 may include a narrow portion with a certain length.

<Regarding Transitional Assembly 61>

The state in which the retainer 30 is arranged in the airbag 50 such that the first engagement portion 35 and the second engagement portion 39 are located in the accommodation portion 51 may be referred to as the transitional assembly 61.

The state in which the retainer 30 is arranged in the airbag 50 such that part of or the entire holding portion 31 is exposed from the accommodation portion 51 may be referred to as the transitional assembly 61.

Other Modifications

The airbag apparatus 60 may be applied to an airbag apparatus of a type that does not take the intermediate state, which is the transitional assembly 61, but the retainer 30 and the inflator 20 are substantially simultaneously assembled to the airbag 50. In this case, the insertion port 54 of the airbag 50 can be omitted.

The above described airbag apparatus 60 can be applied to various types of airbag apparatuses such as a side airbag apparatus.

Vehicles to which the airbag apparatus according to the present invention is applied include various industrial vehicles in addition to private automobiles.

The airbag apparatus 60 may be applied not only to the airbag apparatus installed in vehicles, but also to airbag apparatuses installed in other types of vehicles such as aircrafts and ships.

The invention claimed is:

1. A method for assembling an airbag apparatus, wherein the airbag apparatus includes:
an airbag;
a retainer secured to the airbag; and
an elongated inflator that is attached to the retainer and discharges gas for inflating the airbag, wherein
the retainer includes a retainer securing portion, wherein the retainer securing portion protrudes in a first direction intersecting an axis of the inflator and secures the retainer to a transport vehicle together with the airbag,
the inflator includes an inflator securing portion, wherein, before the inflator is attached to the retainer, the inflator securing portion is configured to protrude in a second direction intersecting the axis of the inflator, the second direction being in a direction different from the first direction, and after the inflator is attached to the retainer, the inflator securing portion is configured to secure the inflator to the transport vehicle in a state in which the inflator securing portion is at least engaged with an engaging portion provided at the retainer, and
an insertion port is formed at part of the airbag separated along the axis from the retainer securing portion, the method for assembling the airbag apparatus comprising:
preparing a transitional assembly in which at least part of the retainer is arranged inside the airbag and the retainer is secured to the airbag by inserting the retainer securing portion into a base fabric sheet, which forms the airbag, from an inside to an outside of the airbag;
inserting at least part of the inflator into the inside of the airbag of the transitional assembly through the insertion port; and
attaching the inflator to the retainer by engaging at least the inflator securing portion with the engagement portion of the retainer, wherein, in the attaching of the inflator, the inflator securing portion enters into an engagement space of the engagement portion through an inlet of the engagement portion by rotating the inflator about the axis, and
wherein, when the inflator is attached to the retainer, a direction in which the inflator securing portion protrudes is changed from the second direction to the first direction by rotating the inflator about the axis of the inflator.

2. The method for assembling the airbag apparatus according to claim 1, wherein, in the preparing of the transitional assembly, the transitional assembly is prepared in which the engagement portion is arranged in a vicinity of the insertion port.

3. The method for assembling the airbag apparatus according to claim 2, wherein
the retainer includes a holding portion, which covers a second part of the inflator in the direction of the axis, and in the attaching of the inflator, the second part of the inflator is inserted into the holding portion, and the inflator is rotated about the axis so that the inflator securing portion is engaged with the engagement portion.

4. The method for assembling the airbag apparatus according to claim 3, wherein, in the preparing of the transitional assembly, the transitional assembly, in which the holding portion is arranged in the vicinity of the insertion port, is prepared.

5. The method for assembling the airbag apparatus according to claim 1, wherein, in the preparing of the transitional assembly, the transitional assembly, in which the engagement portion, is arranged outside of the airbag.

* * * * *